United States Patent
Vidal et al.

(10) Patent No.: US 11,997,547 B2
(45) Date of Patent: May 28, 2024

(54) MOBILITY MANAGEMENT IN INFORMATION CENTRIC NETWORKING

(71) Applicant: Apple Inc., Cupertino, CA (US)

(72) Inventors: Gabriel Arrobo Vidal, Hillsboro, OR (US); Zongrui Ding, Portland, OR (US); Qian Li, Beaverton, OR (US); Geng Wu, Portland, OR (US)

(73) Assignee: Apple Inc., Cupertino, CA (US)

( * ) Notice: Subject to any disclaimer, the term of this patent is extended or adjusted under 35 U.S.C. 154(b) by 257 days.

(21) Appl. No.: 17/288,263

(22) PCT Filed: Oct. 30, 2019

(86) PCT No.: PCT/US2019/058860
§ 371 (c)(1),
(2) Date: Apr. 23, 2021

(87) PCT Pub. No.: WO2020/092560
PCT Pub. Date: May 7, 2020

(65) Prior Publication Data
US 2021/0385699 A1    Dec. 9, 2021

Related U.S. Application Data

(60) Provisional application No. 62/755,262, filed on Nov. 2, 2018.

(51) Int. Cl.
*H04W 36/00*    (2009.01)
*H04L 45/00*    (2022.01)
*H04W 40/24*    (2009.01)

(52) U.S. Cl.
CPC ......... *H04W 36/0055* (2013.01); *H04L 45/54* (2013.01); *H04W 40/248* (2013.01)

(58) Field of Classification Search
None
See application file for complete search history.

(56) References Cited

U.S. PATENT DOCUMENTS

2016/0366620 A1* 12/2016 Royon ............... H04W 36/0033
2017/0034055 A1*  2/2017 Ravindran ............ H04L 45/745
(Continued)

FOREIGN PATENT DOCUMENTS

WO    2018111030 A1    6/2018
WO    2018128500 A1    7/2018

OTHER PUBLICATIONS

R. Ravindran, et al., Deploynig ICN in 3GPP's 5G NextGen Core Architecture, 2018, 2018 IEEE 5G World Forum (5GWF), p. 26-32 (Year: 2018).*

(Continued)

*Primary Examiner* — Noel R Beharry
*Assistant Examiner* — Angelie T Ngo
(74) *Attorney, Agent, or Firm* — Kowert, Hood, Munyon, Rankin & Goetzel, P.C.

(57) ABSTRACT

Systems and methods of handover in an information-centric network are described. The ICN-CF receives an update request from an ICN ICN-AMF indicating handover of a UE from a source NG-RAN to a target NG-RAN. The ICN-CF transmits, to an ICN router, an update request to update a PIT and/or FIB table to enable data communications with the UE after handover. The request includes the UE and target NG-RAN, and if the source and target ICN-PoA are different, the source and target ICN-PoA and the ICN-GW.

20 Claims, 11 Drawing Sheets

(56) References Cited

U.S. PATENT DOCUMENTS

2017/0257904 A1    9/2017  Mildh
2018/0324091 A1\*  11/2018  Dong ...................... H04L 45/56
2019/0274038 A1\*   9/2019  Wu .................. H04W 36/0033

OTHER PUBLICATIONS

R. Ravindran et al., "Enabling ICN in 3GPP's 5G NextGen Core Architecture", draft-ravi-icnrg-5gc-icn-01, IETF, Feb. 2018, 26 pgs.
"Procedures for the 5G System", Stage 2, Release 15, 3GPP TSG SA, TS 23.502, V15.3.0, Sep. 2018, 330 pgs.
"System Architecture for the 5G System", Stage 2, Release 15, 3GPP TSG SA, TS 23.501, V15.3.0, Sep. 2018, 226 pgs.
International Search Report and Written Opinion for International Application No. PCT/US2019/058860, dated Feb. 24, 2020, 10 pgs.
Office Action for CN Patent Application for Invention No. 201980072393.8; Mar. 1, 2024.

\* cited by examiner

MOBILITY MANAGEMENT IN INFORMATION CENTRIC NETWORKING

This application is a U.S. National Stage filing of International Application No. PCT/US2019/058860, filed Oct. 30, 2019, titled "Mobility Management in Information Centric Networking," which claims the benefit of priority to U.S. Provisional Patent Application Ser. No. 62/755,262, filed Nov. 2, 2018, each of which is incorporated herein by reference in its entirety.

TECHNICAL FIELD

Embodiments pertain to radio access networks (RANs). Some embodiments relate to cellular networks, including Third Generation Partnership Project (3GPP) Long Term Evolution (LTE), $4^{th}$ generation (4G) and $5^{th}$ generation (5G) New Radio (NR) (or next generation (NG)) networks. Some embodiments relate to mobility management in information centric networking (ICN) NG networks.

BACKGROUND

The use of various types of systems has increased due to both an increase in the number and types of user equipment (UEs) using network resources as well as the amount of data and bandwidth being used by various applications, such as video streaming, operating on these UEs. Bandwidth, latency, and data rate enhancement may be used to deliver the continuously-increasing demand for network resources. The next generation wireless communication system will provide ubiquitous connectivity and access to information, as well as ability to share data, by various users and applications. NG systems are expected to have a unified framework in which different and sometimes conflicting performance criteria and services are to be met. For example, in ICN systems, tracking of UE mobility may differ from methodology used in 4G systems.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate specific aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Figure 1:
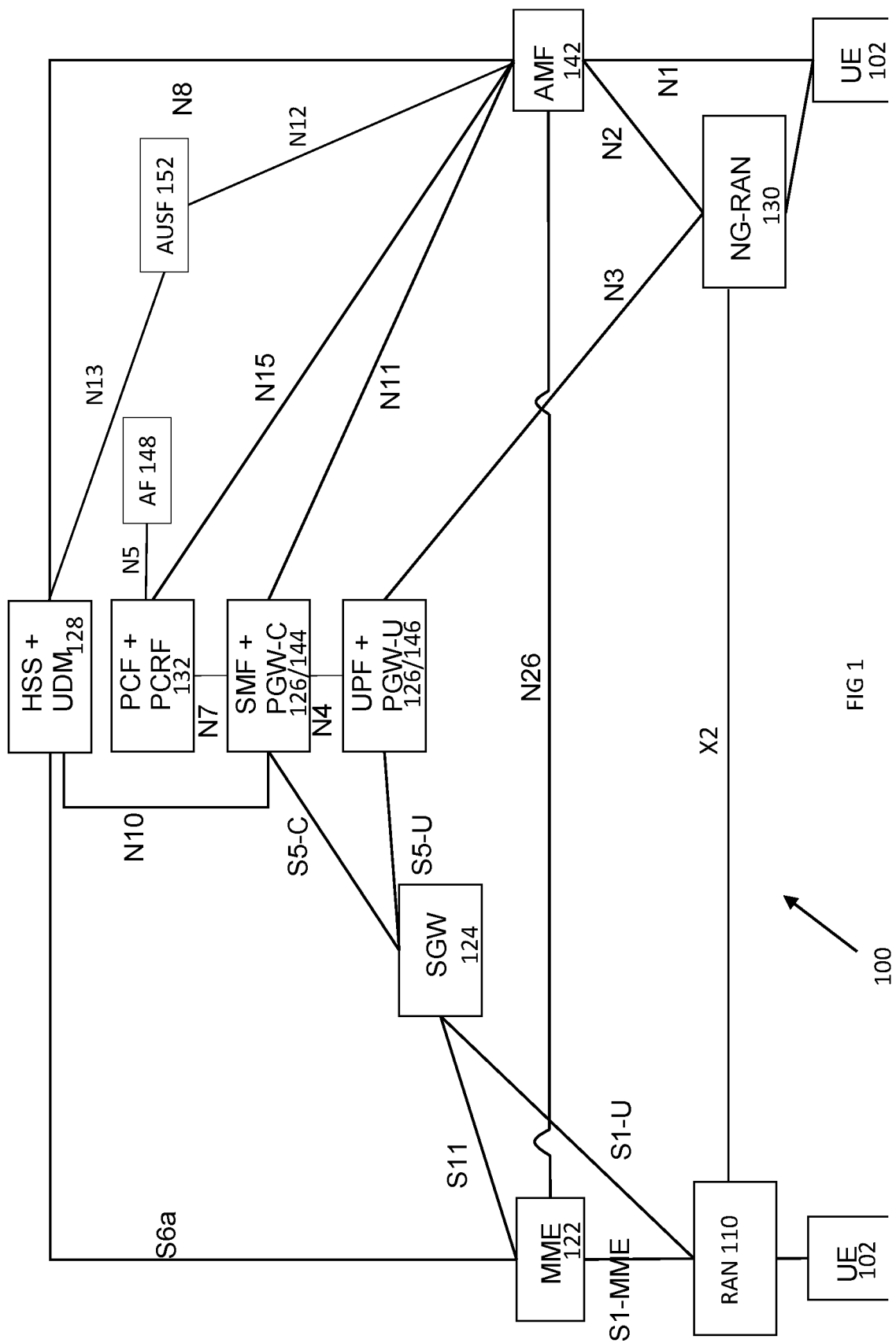
FIG. 1 illustrates combined communication system in accordance with some embodiments.

FIG. 1 illustrates a combined communication system in accordance with some embodiments. The system 100 includes 3GPP LTE/4G and 5G network functions. A network function can be implemented as a discrete network element on a dedicated hardware, as a software instance running on dedicated hardware, or as a virtualized function instantiated on an appropriate platform, e.g., dedicated hardware or a cloud infrastructure.

The evolved packet core (EPC) of the LTE/4G network contains protocol and reference points defined for each entity. These core network (CN) entities may include a mobility management entity (MME) 122, serving gateway (S-GW) 124, and paging gateway (P-GW) 126.

In the NG network, the control plane and the user plane are separated, which may permit independent scaling and distribution of the resources of each plane. The UE 102 may be connected to a radio access network (RAN) 110 and connected to the NG-RAN 130 (gNB) or an Access and Mobility Function (AMF) 142. The RAN 110 may be an eNB or a general non-3GPP access point, such as that for Wi-Fi. The NG core network may contain multiple network functions besides the AMF 112. The UE 102 may generate, encode and perhaps encrypt uplink transmissions to, and decode (and decrypt) downlink transmissions from, the RAN 110 and/or gNB 130 (with the reverse being true by the RAN 110/gNB 130).

The network functions may include a User Plane Function (UPF) 146, a Session Management Function (SMF) 144, a Policy Control Function (PCF) 132, an Application Function (AF) 148, an Authentication Server Function (AUSF) 152 and User Data Management (UDM) 128. The various elements are connected by the NG reference points shown in FIG. 1.

The AMF 142 may provide UE-based authentication, authorization, mobility management, etc. The AMF 142 may be independent of the access technologies. The SMF 144 may be responsible for session management and allocation of IP addresses to the UE 102. The SMF 144 may also select and control the UPF 146 for data transfer. The SMF 144 may be associated with a single session of the UE 102 or multiple sessions of the UE 102. This is to say that the UE 102 may have multiple 5G sessions. Different SMFs may be allocated to each session. The use of different SMFs may permit each session to be individually managed. As a consequence, the functionalities of each session may be independent of each other. The UPF 126 may be connected with a data network, with which the UE 102 may communicate, the UE 102 transmitting uplink data to or receiving downlink data from the data network.

The AF 148 may provide information on the packet flow to the PCF 132 responsible for policy control to support a desired QoS. The PCF 132 may set mobility and session management policies for the UE 102. To this end, the PCF 132 may use the packet flow information to determine the appropriate policies for proper operation of the AMF 142 and SMF 144. The AUSF 152 may store data for UE authentication. The UDM 128 may similarly store the UE subscription data.

The gNB 130 may be a standalone gNB or a non-standalone gNB, e.g., operating in Dual Connectivity (DC) mode as a booster controlled by the eNB 110 through an X2 or Xn interface. At least some of functionality of the EPC and the NG CN may be shared (alternatively, separate components may be used for each of the combined component shown). The eNB 110 may be connected with an MME 122 of the EPC through an S1 interface and with a SGW 124 of the EPC 120 through an S1-U interface. The MME 122 may be connected with an HSS 128 through an Sha interface while the UDM is connected to the AMF 142 through the N8 interface. The SGW 124 may connected with the PGW 126 through an S5 interface (control plane PGW-C through S5-C and user plane PGW-U through S5-U). The PGW 126 may serve as an IP anchor for data through the internet.

The NG CN, as above, may contain an AMF 142, SMF 144 and UPF 146, among others. The eNB 110 and gNB 130 may communicate data with the SGW 124 of the EPC 120 and the UPF 146 of the NG CN. The MME 122 and the AMF 142 may be connected via the N26 interface to provide control information there between, if the N26 interface is supported by the EPC 120. In some embodiments, when the gNB 130 is a standalone gNB, the 5G CN and the EPC 120 may be connected via the N26 interface.

Figure 2:
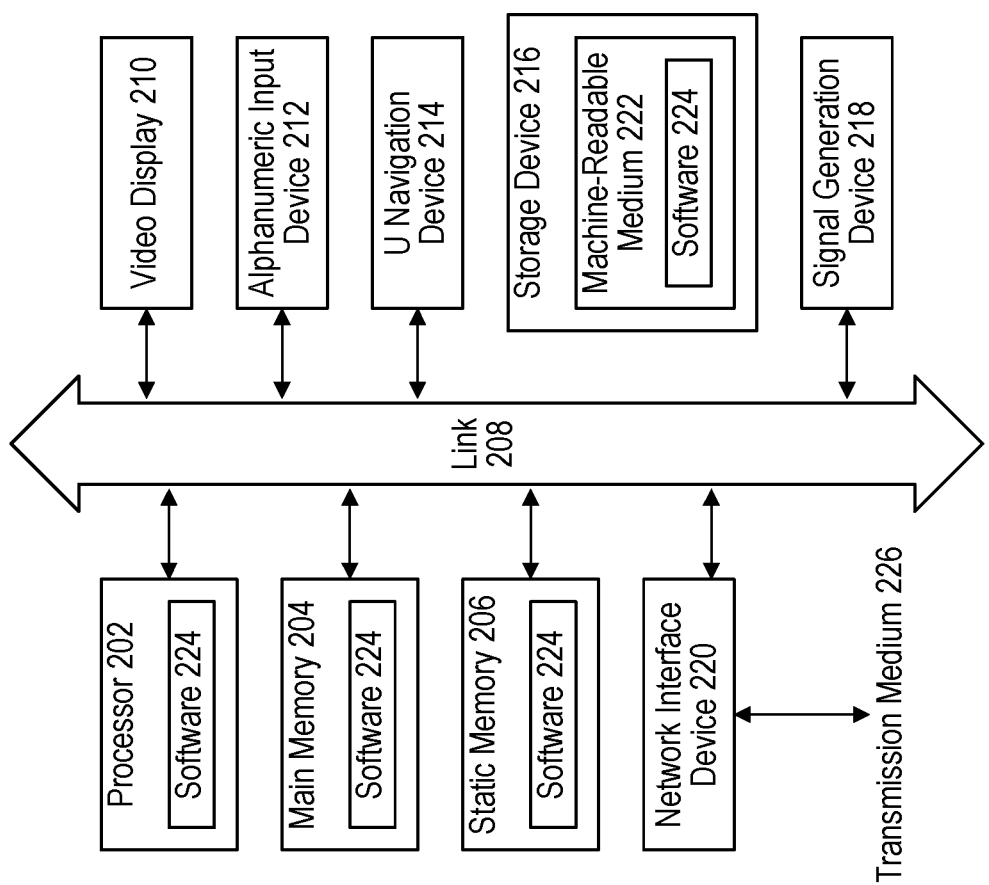
FIG. 2 illustrates a block diagram of a communication device in accordance with some embodiments.

FIG. 2 illustrates a block diagram of a communication device in accordance with some embodiments. In some embodiments, the communication device may be a UE (including an IoT device and NB-IoT device), eNB, gNB or other equipment used in the 4G/LTE or NG network environment. For example, the communication device 200 may be a specialized computer, a personal or laptop computer (PC), a tablet PC, a mobile telephone, a smart phone, a network router, switch or bridge, or any machine capable of executing instructions (sequential or otherwise) that specify actions to be taken by that machine. In some embodiments, the communication device 200 may be embedded within other, non-communication-based devices such as vehicles and appliances.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, successfully or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a NG/NR standards among others. In an example, the network interface device 220 may include one or more physical jacks (e.g., Ethernet, coaxial, or phone jacks) or one or more antennas to connect to the transmission medium 226.

The communication device 200 may be an IoT device (also referred to as a "Machine-Type Communication device" or "MTC device"), a narrowband IoT (NB-IoT) device, or a non-IoT device (e.g., smart phone, vehicular UE), any which may communicate with the core network via the eNB or gNB shown in FIG. 1. The communication device 200 may be an autonomous or semiautonomous device that performs one or more functions, such as sensing or control, among others, in communication with other communication devices and a wider network, such as the Internet. If the communication device 200 is IoT device, in some embodiments, the communication device 200 may be limited in memory, size, or functionality, allowing larger numbers to be deployed for a similar cost to smaller numbers of larger devices. The communication device 200 may, in some embodiments, be a virtual device, such as an application on a smart phone or other computing device.

Current networking architecture is based on IP to transport IP, Ethernet and non-IP packets. That is, communication is host-to-host and content delivery relies on sessions between two end points (protocol data unit (PDU) sessions inside the cellular network and, typically, TCP sessions between client and server). The maintenance of these end-to-end sessions may be complex and error-prone. Additionally, bottlenecks can be created anywhere in the network because multiple users might be requesting the same content without the network having any knowledge of the multiple requests, causing a non-optimal utilization of the link resources. Moreover, inside the network (core network and/or data network), it may be impossible to share the content among different users requesting the same content.

Figure 3:
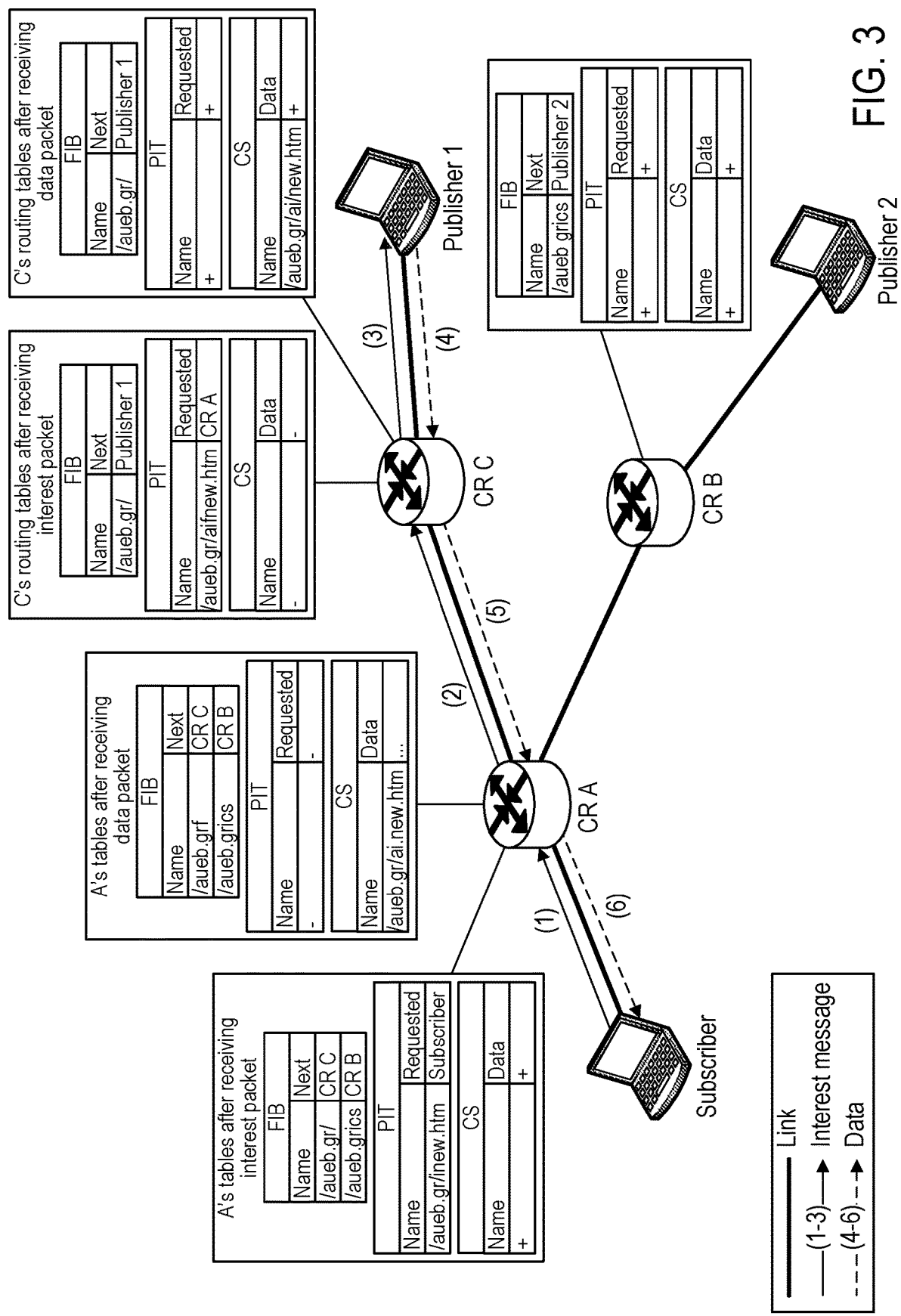
FIG. 3 illustrates an information-centric networking (ICN) request/response in accordance with some embodiments.

To combat this, Information Centric Networking (ICN) may be used. FIG. 3 illustrates an information-centric networking (ICN) request/response in accordance with some embodiments. As shown, ICN works in a pull-based model, in which two types of packets are defined: an interest packet and a data packet. An interest packet (request) may flow from a consumer (e.g., a laptop or smartphone) through an access point and content router(s) to a producer of the content (e.g., server) or to a network device having a cached copy of the content. The content is retrieved from the producer and the data packet (response) traverses the path in the opposite direction. ICN is based on a data structure that includes a Pending Interest Table (PIT), Forward Information Base (FIB) table, and Content Store (CS). ICN may also use interest forwarding strategies which take input from both FIB table and network/device measurements to make interest forwarding decisions.

With more specificity, the requestor (consumer/client) may send an interest packet with an indicator (e.g., a prefix) to identify the desired content (e.g., by the name of the content). ICN packets may be constructed in a Type-Length-Value (TLV) format. The prefix value may be generally the "name" to identify a content, although another type of indicator may be used. The type field of an outer TLV can indicate whether the ICN packet is an interest packet or data packet. The Uniform Resource Identifier (URI) is widely used to name the resources, which is constructed based on a naming convention; the indicator, however, may use an identifier other than the URI. Each of the forwarding nodes may check the prefix of the interest packet and check the CS to see whether the forwarding node has the requested content cached therein. If so, the forwarding node may reply with a data packet that matches the prefix. If there is no match, the interest packet is passed to the PIT to find a matching name; if no match is found, the node records the interest in its PIT and forwards the interest to the next hop(s) towards the requested content based on the information in its FIB table (the next of which may again have a cached copy of the requested data or may be closer to the producer). The interest packet can also reach the source (producer, which may be a server) and obtain the data packet from the source. As above, the data packet, wherever retrieved, traverses the path to the consumer in the opposite direction as the interest packet.

As is apparent, ICN may be a session-less protocol in which a consumer (client) requests content (e.g., a chunk of data) to the network and data is retrieved from wherever the content is in the network. Accordingly, ICN brings application layer optimizations down to the networking layer. That is, functionalities that were previously implemented in the application layer such as Edge Computing (caching), are naturally supported by ICN in the network layer (L3).

Mobility management in IP networks has been an active field because IP was not designed taking into account mobility. Therefore, multiple enhancements to IP have been standardized with the goal of transparent transport/route IP packets to mobile devices. Mobile ICN mobility may be viewed from three different perspectives: i) Subscriber/Consumer mobility; ii) Publisher/Producer mobility; and iii) Subscriber and Publisher mobility. Named Data Networking (NDN) and Content-Centric Networking (CCN) are implementations of ICN and indicate that subscriber/consumer mobility may be natively supported in their architectures because any interest packet that is not satisfied (received a data packet in response) due to the consumer mobility may be retransmitted from the consumer's new location. In NDN and CCN, publisher's mobility may be more difficult to handle compared to subscriber/consumer mobility, instead using methods such as Kite for NDN, Map-Me for CCN and ID/Locator split for NDN/CCN. Kite may use a rendezvous server (RV) to create a hop-by-hop path between the RV and a mobile producer by exchanging Interest-Data packets. Map-Me may create a new type of packet called Interest Update (IU), which the mobile producer may send from its new location to itself in its previous location. This IU may be used to update the routing tables of the nodes between the new and old locations. And ID/Locator split may rely on splitting the ICN namespace to support the use of persistent names. This may be achieved by a Mobility Service (MS)

agent in each ICN router in the edge of the network (wireless side), each of which may be controlled by a MS controller.

In ICN, consumer mobility may be handled by retransmitting the interest packets that have not been satisfied. This mechanism, however, may bring packet losses and delay. On the other hand, producer mobility may use some type of additional "signaling" (e.g. interest updates) to keep track of the mobile producer. Currently, continuity of service in ICN may not be of paramount import as most of the traffic is not time-sensitive traffic, such as video streaming.

This, however, may change as cellular networks satisfy stringent requirements for the services they provide (time-sensitive and non-time-sensitive applications) and the architecture is designed to enable seamless mobility (using control plane and Xn interface). That is, the gNB may keep track of the active users and properly hand the UEs over to other gNBs based on various measurements. In other words, the network may have knowledge of the location of the UEs at all times. Unfortunately, ICN may not efficiently support this as mobility is not being tracked by any point of attachment (PoA).

Accordingly, procedures to handle mobility management are presented herein. The handover procedures are for inter NG-RAN handover without N2 interface involvement and inter NG-RAN handover based on the N2 interface.

Figure 4:
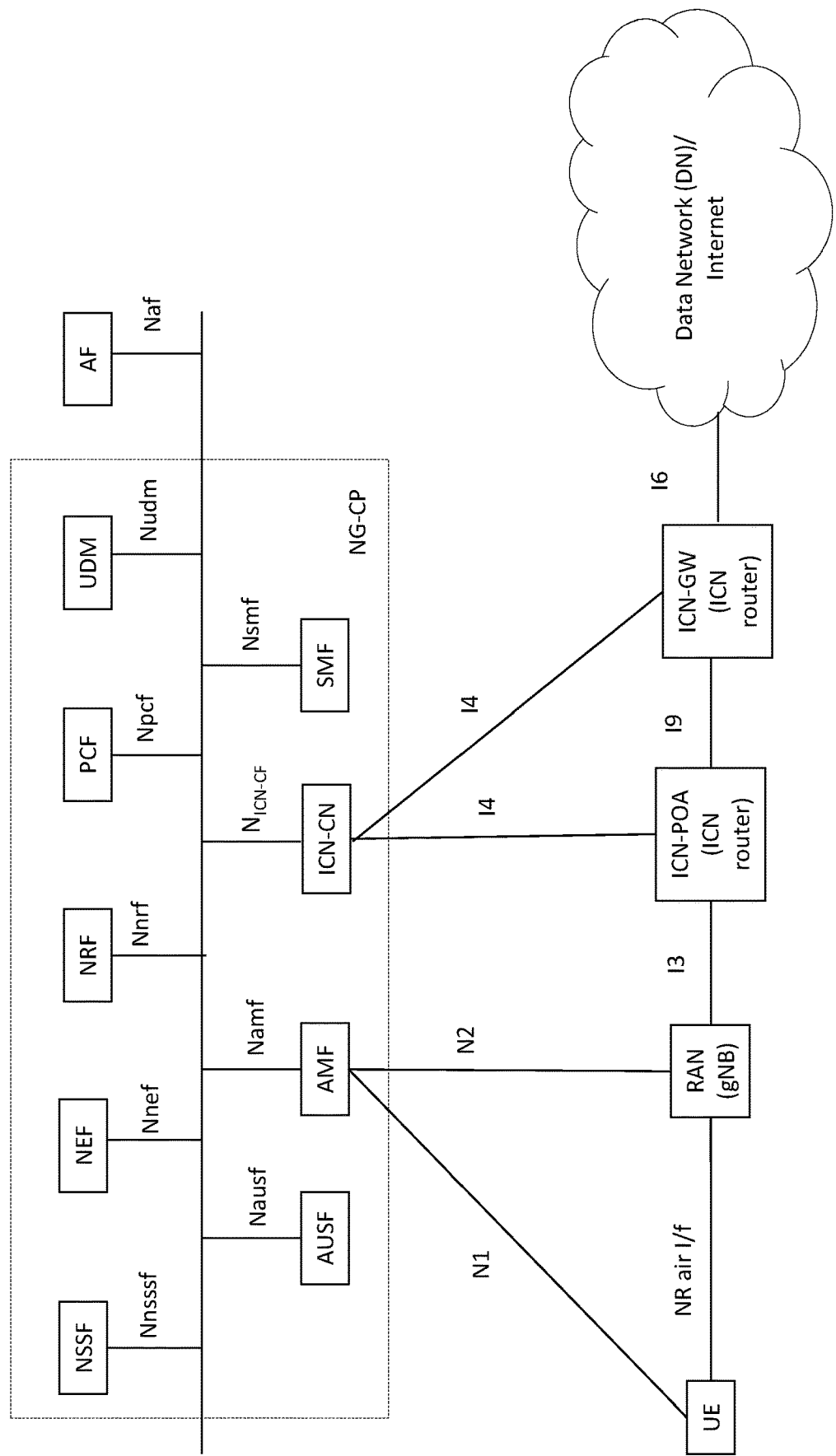
FIG. 4 illustrates an ICN 5G architecture in accordance with some embodiments.

FIG. 4 illustrates an ICN 5G architecture in accordance with some embodiments. The architecture shown in FIG. 4 may support ICN in next generation cellular networks. The ICN Point of Attachment (ICN-PoA) and ICN Gateway (ICN-GW) are two entities that i) report ICN event information to ICN Control Function (ICN-CF) to generate charging records for ICN and ii) receive from ICN-CF information about rules and policies to be applied to ICN traffic.

The ICN-PoA may serve as the first ICN-aware user plane entity for UEs running ICN applications/services. The ICN-GW may be a user plane ICN entity that interfaces with the DN. It should be noted that the ICN-GW and the UPF PSA (PDU Session Anchor) could be in the same entity. In particular, an ICN-UPF entity could be instantiated, where the functionality of the ICN-GW could be part of the UPF (PSA). The ICN-CF may handle the ICN related information and policy and generate ICN transaction history among other ICN related functionalities. As the various ICN entities may be functional entities, they can be part of existing CN entities to ensure a flexible implementation of ICN.

The new functional entities (ICN-CF, ICN-PoA, ICN-GW) shown in FIG. 4 may enable ICN in NG cellular networks from the perspective of exchanging ICN related information in the network. The ICN-PoA may serve as the first ICN-aware user plane entity for UEs running ICN applications and the ICN-GW may be a user plane ICN entity that interfaces with the DN, which may also support ICN-based schemes. The ICN-GW and the UPF PDU Session Anchor (PSA) may, in some embodiments, be in the same entity. That is, an ICN-UPF entity could be instantiated, where the functionality of the ICN-GW could be part of (or combined with) the UPF (PSA). The ICN-CF may handle the ICN related information and policy and generate ICN transaction history among other ICN related functionalities. These entities may be functional entities and can be incorporated within existing 5GC entities for flexibility. As used herein, transmissions between various entities may include encoding at the transmitting entity and decoding at the receiving entity.

Figure 5:
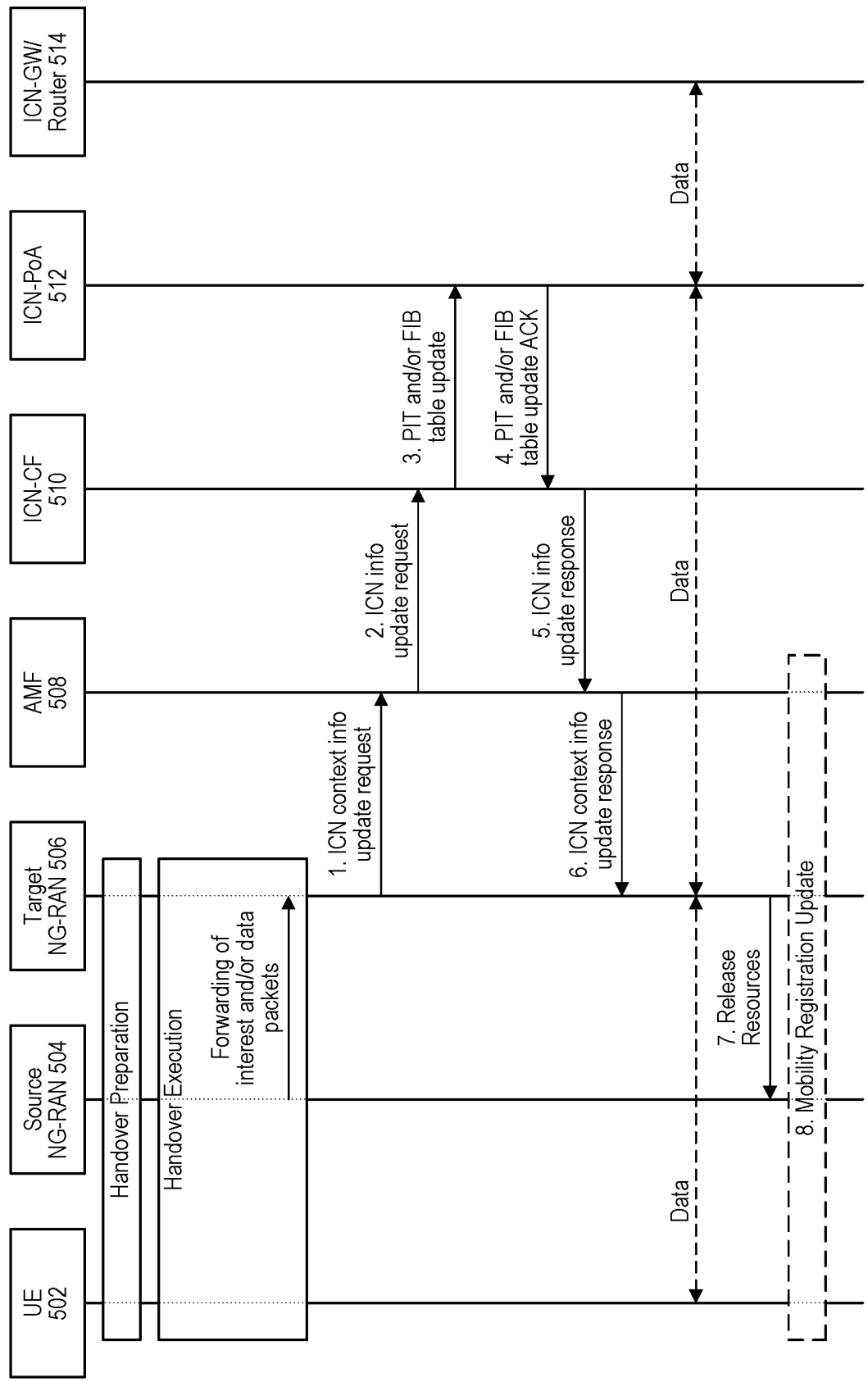
FIG. 5 is an inter-NG-RAN ICN handover procedure in accordance with some embodiments.

FIG. 5 is an inter-NG-RAN ICN handover procedure in accordance with some embodiments. It will be apparent that FIG. 5 is merely an example, and other embodiments may modify or omit some operations shown in FIG. 5, include additional operations not shown in FIG. 5, and/or perform operations in a different order as appropriate. The procedure shown in FIG. 5 may be used to hand over a UE 502 from a source NG-RAN 504 to a target NG-RAN 506 when both source and target NG-RANs 504, 506 are connected to the same ICN-PoA 512 using the Xn interface. As shown, prior to engaging in handover, the UE 502, source NG-RAN 504, and target NG-RAN 506 may engage in handover preparation. This may include, among others, the UE 502 measuring reference signals from the source NG-RAN 504 and target NG-RAN 506 and sending the measurements or RRC messaging to the source NG-RAN 504 that handover is desired. The source NG-RAN 504 may, in turn, communicate with the target NG-RAN 506 to prepare for handover of the UE 502, which may or may not be accepted by the target NG-RAN 506. After acceptance but before completion of the handover procedure, the source NG-RAN 504 may transmit interest packets from the UE 502 to the target NG-RAN 506, and the target NG-RAN 506 may transmit data packets for the UE 502 to the source NG-RAN 504.

The target NG-RAN 506 may then, at operation 1, transmit an ICN context info update request to the AMF 508. The ICN context info update request may indicate the handover to the AMF 508. The context info update may include the identity (ID) of the UE, the identity of the source cell and the identity of the target cell.

At operation 2, the AMF 508 may pass information about the handover to the ICN-CF 510. The ICN info update request may include the UE ID for the ICN-CF 510 to identify the name(s)/prefix(es) that the UE 502 is using to request data and/or provide content. Moreover, since the ICN-CF 510 knows the ICN-PoA 512 that the UE 502 is attached to through the Source NG-RAN 504, the ICN-CF 510 can know whether a change in ICN-PoA is to be undertaken, or, if not, whether PIT and/or FIB table updates are to be performed in the current ICN-PoA 512.

If PIT and/or FIB table updates are to be performed, at operation 3, the ICN-CF 510 may indicate this to the current ICN-PoA 512 using a PIT Update (Incoming face) and/or FIB table Update (Outgoing face). Based on the UE's ID, the ICN-CF 510 may indicate the name(s) that the ICN-PoA 512 is to update in the PIT and/or the name(s) to be updated in the FIB table.

As above, in ICN the data packets may follow the reverse path of the interest packets to reach the consumer (UE 502). When the UE 502 is a consumer and since the ICN-PoA 512 is the first ICN-aware element from the UE's perspective, in some embodiments only the incoming face (from the Source NG-RAN 504 to the Target NG-RAN 506) of the PIT of the ICN-PoA 512 may be updated/changed for the interest packets sent by the UE 502. When the UE 502 is a producer, only the outgoing face of the FIB table of the ICN-PoA 512 may be updated/changed for the data packets to be forwarded to the UE's new location (through the target NG-RAN 506).

After updating/changing the PIT and FIB table, the ICN-PoA 512 may at operation 4 acknowledge to the ICN-CF 510 successful execution of the PIT and/or FIB table update. In response, at operation 5, the ICN-CF 510 may send an ICN info update response to the AMF 508. The ICN info update response may confirm update of the PIT and/or FIB table at the ICN-PoA 512.

At operation 6, the AMF 508 may send an ICN context info update response to the target NG-RAN 506. The ICN context info update response may confirm that the ICN-PoA 512 was properly reconfigured (i.e., PIT and/or FIB table were updated).

At operation 7, the target NG-RAN 506 may then send a Release Resources message to the source NG-RAN 504. The Release Resources message may confirm the success of the handover to the source NG-RAN 504 and may trigger the release of resources in the source NG-RAN 504.

At operation 8, the UE 502 may initiate a Mobility Registration Update under different circumstances. The Mobility Registration Update may be initiated when changing to a new Tracking Area (TA) outside the UE's Registration Area in both CM-CONNECTED and CM-IDLE state. In addition, the Mobility Registration Update may be initiated when the UE 502 is to update its capabilities or protocol parameters that are negotiated in Registration procedure with or without changing to a new TA.

Figure 6:
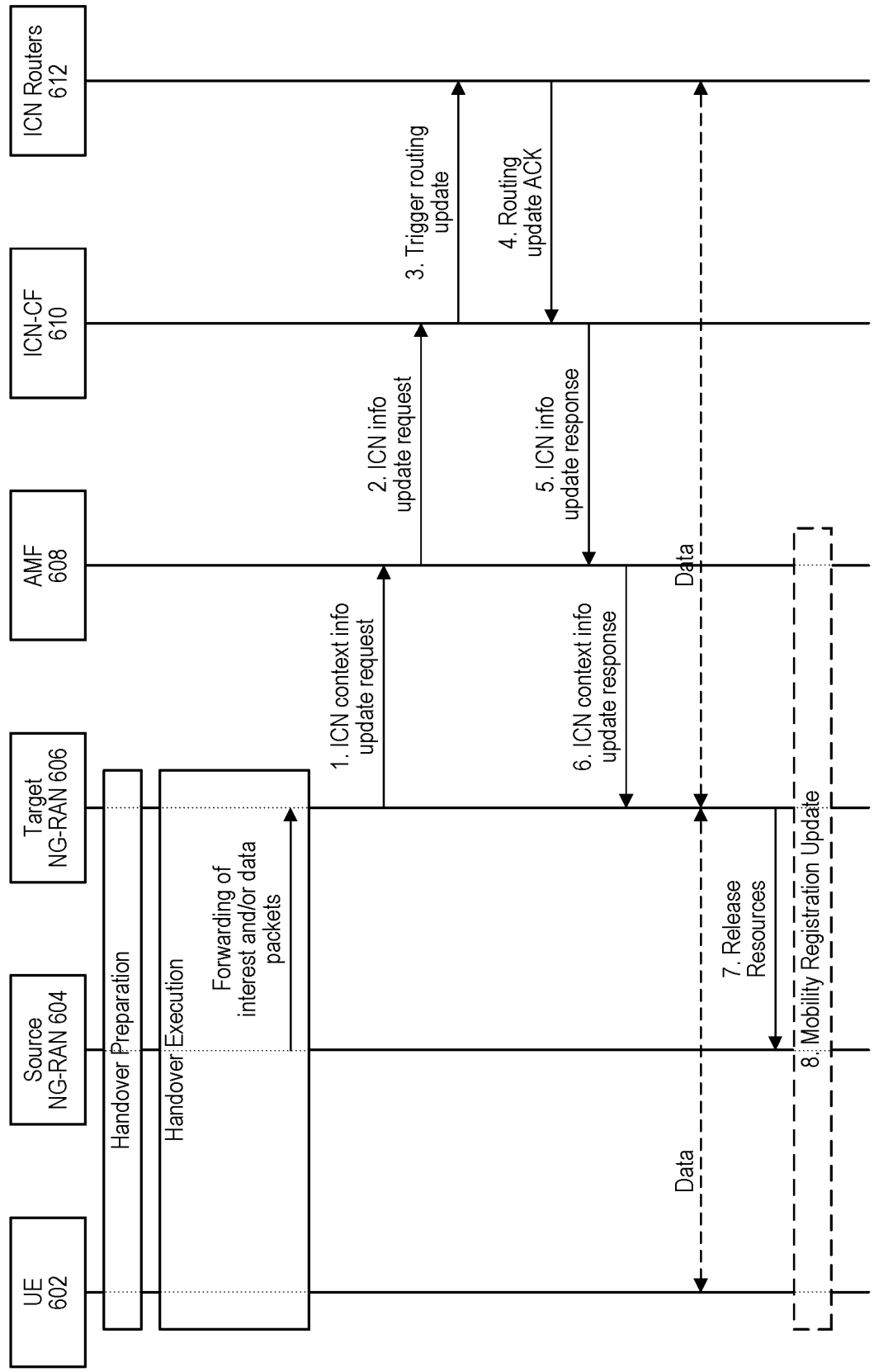
FIG. 6 is another inter-NG-RAN ICN handover procedure in accordance with some embodiments.

FIG. 6 is another inter-NG-RAN ICN handover procedure in accordance with some embodiments. It will be apparent that FIG. 6 is merely an example, and other embodiments may modify or omit some operations shown in FIG. 6, include additional operations not shown in FIG. 6, and/or perform operations in a different order as appropriate. Specifically, FIG. 6 shows an inter NG-RAN handover embodiment in which the ICN-PoA is re-allocated; that is when the source and target NG-RANs 604, 606 are connected to different ICN-PoAs using the Xn interface.

Similar to FIG. 5, in FIG. 6 prior to engaging in handover, the UE 602, source NG-RAN 604, and target NG-RAN 606 may engage in handover preparation. After acceptance but before completion of the handover procedure, the source NG-RAN 604 may transmit interest packets from the UE 602 to the target NG-RAN 606, and the target NG-RAN 606 may transmit data packets for the UE 602 to the source NG-RAN 604.

At operation 1, an ICN context info update request may be sent by the target NG-RAN 606 to the AMF 608. The ICN context info update request may indicate the handover to the AMF 608. The AMF 608 may provide this information to the ICN routers 612 through the ICN-CF 610. The ICN routers 612 may include one or more ICN-PoAs. The context info update may include the UE ID, source cell ID and target cell ID.

At operation 2, the AMF 608 may pass the information about the handover to the ICN-CF 610. The ICN info update request may include the UE ID for the ICN-CF 610 to identify the name(s)/prefix(es) that the UE 602 is using to request data and/or provide content. The request may also include the source and target cell IDs. The ICN-CF 610 may use the source and target cell IDs to confirm that the source and target cell are not attached to the same ICN-PoA. The ICN-CF 610 may use the UE's ID to know the name(s)/prefix(es) that are used to request/provide content.

Operations 3 and 4 show the handover communication between the ICN-CF 610 and the ICN routers 612 (including ICN-PoAs and ICN-GW). The routing table updates may thus be sent through the $I_4$ (ICN-CF—ICN router) interface. Since the ICN-PoA is changed, the ICN-CF 610 may at operation 3 signal all the ICN routers 612 in the core network to update their routing tables indicating the target ICN-PoA through which the name(s)/prefix(es) can be reached. That is, the trigger routing update message may include information about the faces (in PIT and FIB tables) and name(s)/prefix(es) to be updated in the routing tables of the ICN routers 612. The ICN routers 612 may include the source ICN-PoA, target ICN-PoA and ICN-GW. If the source ICN-PoA is serving the name(s)/prefix(es) for more than one UE, the routing tables may be updated accordingly such that the handover UE 602 and the other UEs can still reach the content. At operation 4, all ICN routers 612, including ICN-PoAs, may acknowledge the routing table update.

At operation 5, the ICN-CF 610 may send an ICN info update response to the AMF 608. The ICN info update response may confirm that the routing table for each ICN router 612 was updated.

The AMF 608 may at operation 6 send the ICN context info update response to the target NG-RAN 606. The ICN context info update response may confirm that the ICN routers 612 were properly reconfigured (i.e., routing tables were updated).

The target NG-RAN 606 may then at operation 7 send a Release Resources message to the source NG-RAN 604. The Release Resources message may confirm the success of the handover and trigger the release of resources in the source NG-RAN 604.

At operation 8, the UE 502 may initiate a Mobility Registration Update under different circumstances. The Mobility Registration Update may be initiated when changing to a new Tracking Area (TA) outside the UE's Registration Area in both CM-CONNECTED and CM-IDLE state. In addition, the Mobility Registration Update may be initiated when the UE 502 is to update its capabilities or protocol parameters that are negotiated in Registration procedure with or without changing to a new TA.

Figure 7A:
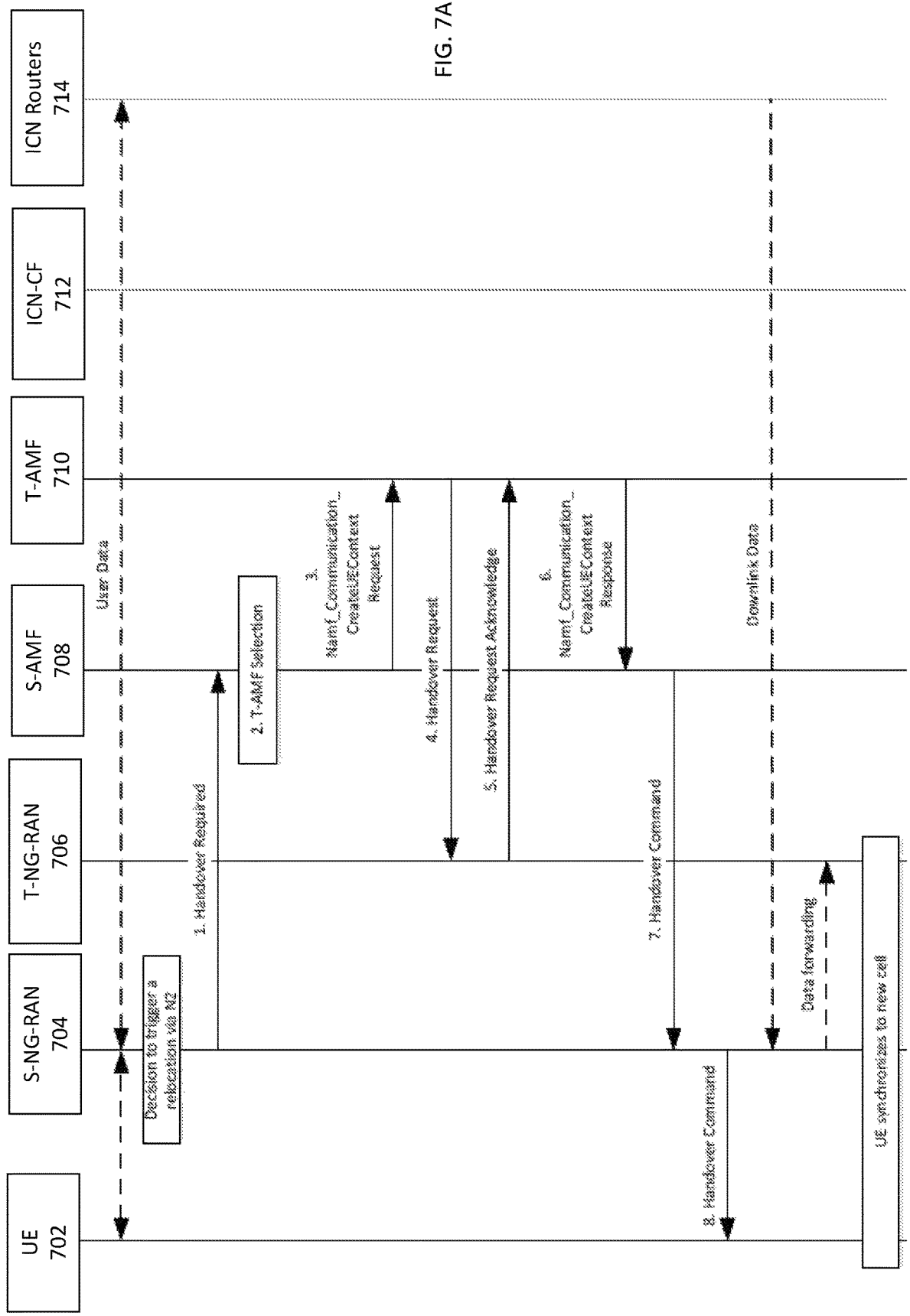
FIG. 7A is a first portion of an inter-NG-RAN N2-based handover procedure in accordance with some embodiments.
Figure 7B:
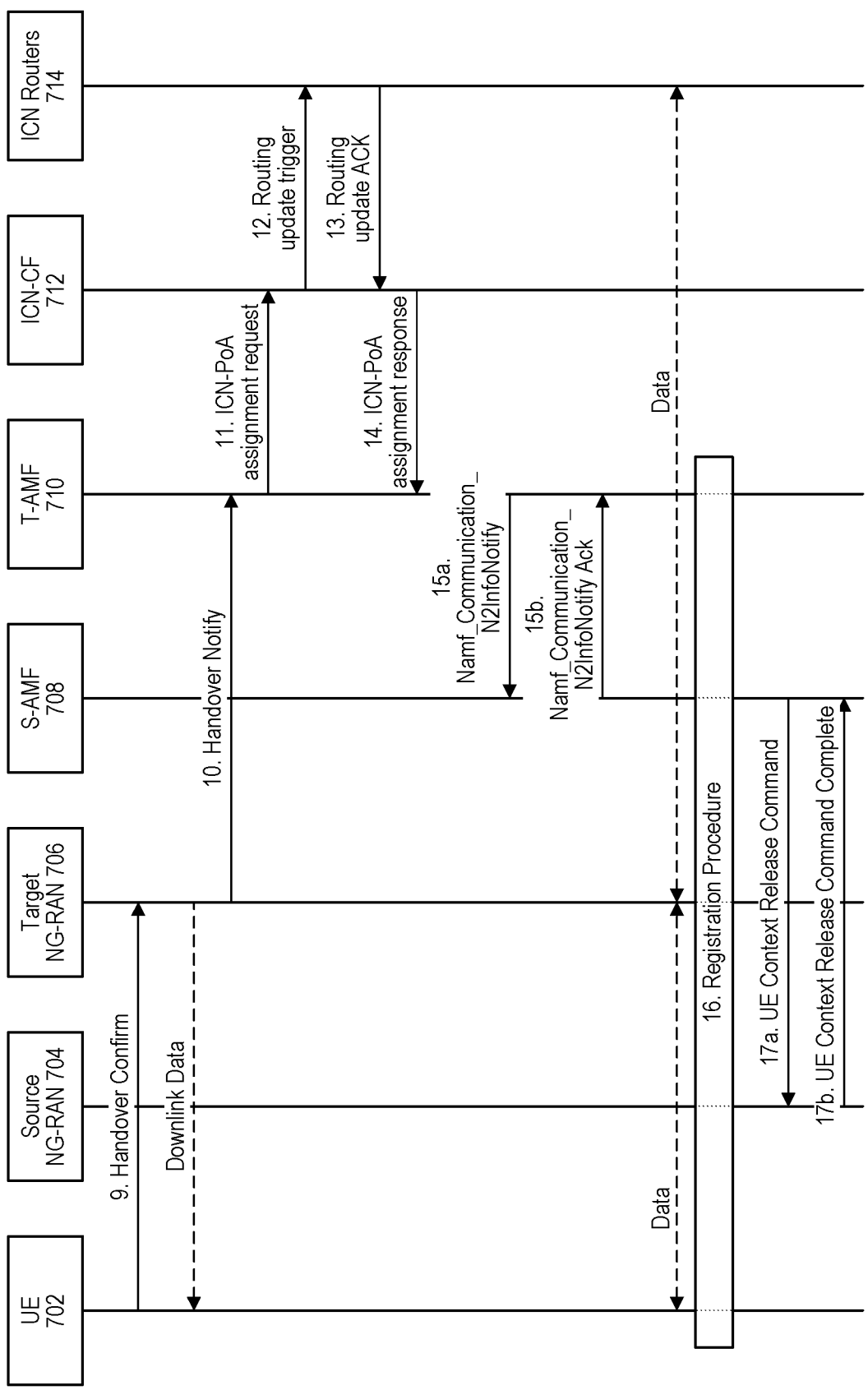
FIG. 7B is a second portion of the inter-NG-RAN N2-based handover procedure of FIG. 7A in accordance with some embodiments.

FIGS. 7A and 7B show an inter-NG-RAN N2-based handover procedure in accordance with some embodiments. It will be apparent that FIGS. 7A and 7B is merely an example, and other embodiments may modify or omit some operations shown in FIGS. 7A and 7B, include additional operations not shown in FIGS. 7A and 7B, and/or perform operations in a different order as appropriate. Specifically, FIGS. 7A and 7B show handover of a UE 702 when no X2 connection exists between the source and target NG-RANs 704, 706. In this case, the source and target AMFs 708, 710 are used to relay the handover information between the source and target NG-RANs 704, 706.

In particular, the UE 702 may communicate data with the ICN Routers 714 (which may include the ICN-PoAs and ICN-GW) via the S-NG-RAN 704. Rather than starting with the handover preparation between the source and target NG-RANs, as shown in FIGS. 5 and 6, since the source and target NG-RANs 704, 706 may be unable to communicate directly, the source NG-RAN 704 may determine that handover of the UE 702 is to occur based on the measurements sent by the UE 702. After the source NG-RAN 704 determines that handover of the UE 702 is to occur, at operation 1 the S-NG-RAN 704 may send a Handover required message to the source AMF 708. The Handover required message may include information about the target NG-RAN 706 as well as information about the data radio bearers (DRBs) from the source NG-RAN 704 to be used by the target NG-RAN 706.

In response to reception of the Handover required message, the S-AMF 708 at operation 2 may select the T-AMF 710 to serve the UE 702 when the S-AMF 708 is unable to further serve the UE 702. The selection may be based on the information carried in the Handover required message.

After selection of the T-AMF 710, the S-AMF 708 may initiate a Handover resource allocation procedure. In particular, the S-AMF 708 may at operation 3 send a Namf_Communication_CreateUEContext request for ICN service operation towards the T-AMF 710 to initiate the Handover resource allocation procedure.

In response to reception of the Namf_Communication_CreateUEContext request, the T-AMF 710 may transmit at operation 4 a Handover request to the T-NG-RAN 706. The Handover request may include the identification of the Source NG-RAN 704 and other control information to support ICN service.

Upon reception of the Handover request from the T-AMF 710, the T-NG-RAN 706 may at operation 5 send a Handover Request Acknowledge message to the T-AMF 710. The Handover Request Acknowledge message may include a UE container with an access stratum part and a NAS part. The UE container may be sent transparently via the T-AMF 710, S-AMF 708 and S-NG-RAN 704 to the UE 702. The UE container may also include information about the DRBs that can be supported and served.

After transmission of the Handover Request Acknowledge message, at operation 6 the T-AMF 710 may send a Namf_Communication_CreateUEContext Response to the S-AMF 708. The Namf_Communication_CreateUEContext Response may include all N2 information for the S-AMF 708 to send a Handover Command to the S-NG-RAN 704.

After reception of the Namf_Communication_CreateUEContext Response, the S-AMF 708 may send a Handover Command to the S-NG-RAN 704 at operation 7. In response to reception of the Handover Command from the S-AMF 708, the S-NG-RAN 704 may at operation 8 send a Handover Command to the UE 702. The Handover Command received by the UE 702 may include a UE container with information about the T-NG-RAN 706.

After transmission of the Handover Command to the UE 702, the S-NG-RAN 704 may forward DL data received from the ICN Routers 714 for the UE 702 to the T-NG-RAN 706. The UE 702 may then attempt to synchronize with the T-NG-RAN 706.

After the UE 702 successfully synchronizes with the T-NG-RAN 706, the UE 702 may send a Handover Confirm message to the S-NG-RAN 704 at operation 9. After reception of the Handover Confirm message, the S-NG-RAN 704 may start transmission of buffered DL data for the UE 702 to the UE 702.

In response to reception of the Handover Confirm message, the T-NG-RAN 706 at operation 10 may then send a Handover Notify message to the T-AMF 710. The Handover Notify message may inform the T-AMF 710 of successful handover of the UE 702 to the T-NG-RAN 706.

The T-AMF 710, after reception of the Handover Notify message, may pass information about the handover to the ICN-CF 712 at operation 11 in an ICN-PoA assignment request. The information provided to the ICN-CF 712 may include the UE ID involved in the handover and the target NG-RAN ID.

Using the UE's ID, the ICN-CF 712 may check in its internal registers name(s)/prefix(es) associated to the UE 702 that are to be updated in the ICN routers 714. Using the target cell ID, the ICN-CF 712 may determine the ICN-PoA assigned to the target NG-RAN 706. The ICN-CF 712 may be able to properly construct a routing update trigger message that is sent to the ICN Routers 714 at operation 12. The routing update trigger message may include modified/updated faces for the PIT and/or FIB tables of the ICN Routers 714 (including UE, S-NG-RAN, T-NG-RAN, and GW ID). The ICN-CF 712 may thus trigger all ICN routers 714 in the core network to update their routing tables indicating the new ICN-PoA through which the prefix(es) can be reached for the UE 702 in its new location.

In response to reception of the routing update trigger message the ICN routers 714, including ICN-PoAs, may acknowledge the routing table update through a routing table update acknowledgement message. At operation 13, the routing table update acknowledgement message may be sent to the ICN-CF 712 from the ICN routers 714.

After reception of the routing table update acknowledgement message, the ICN-CF 712 may send an ICN info update response (ICN-PoA assignment response) to the T-AMF 710 at operation 14. The ICN info update response may confirm to the T-AMF 710 the routing table for all ICN routers were successfully updated.

After reception of the ICN info update response, the T-AMF 710 may at operation 15a notify the S-AMF 708 about the N2 handover Notify message received from the T-NG-RAN 706. To provide this information, the T-AMF 710 may send a Namf_Communication_N2InfoNotify message to the S-AMF 708. A timer in the S-AMF 708 may be started to supervise when resources in the S-NG-RAN 704 are released. The S-AMF 708 may also acknowledge reception of the Namf_Communication_N2InfoNotify message by sending at operation 15b a Namf_Communication_N2InfoNotify ACK to the T-AMF 710.

After operation 14, whether or not operations 15a and 15b have occurred, the UE 702 may initiate at operation 16 a Mobility Registration Update with a subset of the Registration Procedure. After the timer initiated at operation 15b has expired, the S-AMF 708 may transmit to the S-NG-RAN 704 a UE Context Release Command at operation 17a. In response to reception of the UE Context Release Command, at operation 17b, the source NG-RAN 704 may release its resources related to the UE 702. The source NG-RAN 704 may then respond to the UE Context Release Command with a UE Context Release Complete message sent to the S-AMF 708.

Figure 8:
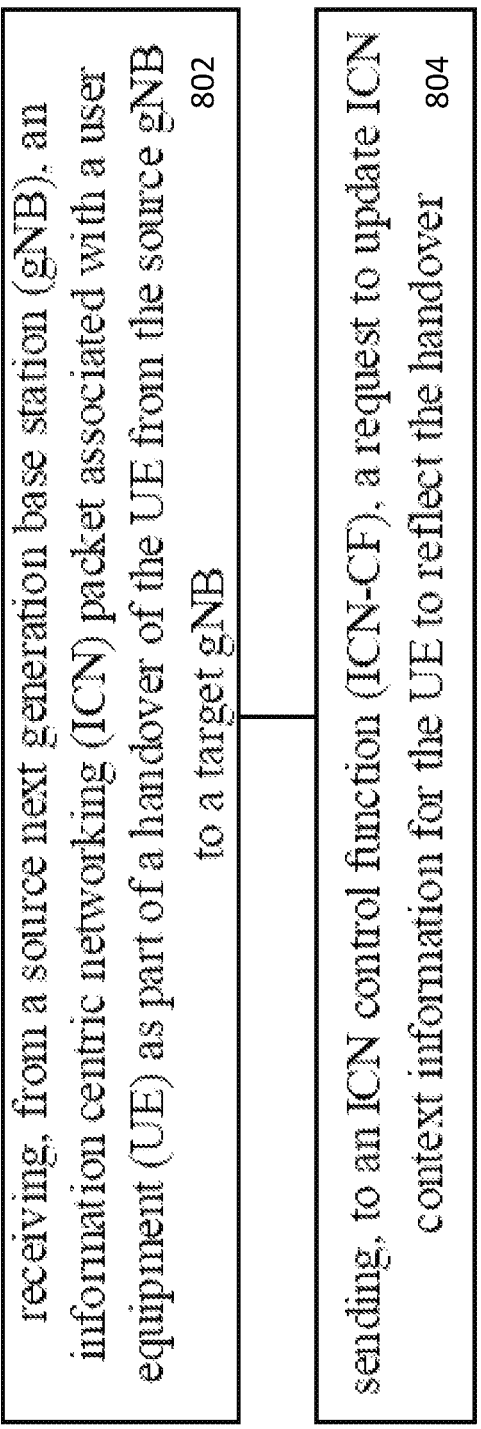
FIG. 8 is an ICN handover method in accordance with some embodiments.

FIG. 8 is an ICN handover method in accordance with some embodiments. The method shown in FIG. 8 may include receiving, at a target gNB from a source gNB, an ICN packet associated with a UE as part of a handover of the UE from the source gNB to a target gNB at operation 802. In response, the target gNB or an AMF (having received an indication from the target gNB) may send to an ICN-CF, at operation 804, a request to update ICN context information for the UE to reflect the handover.

Figure 9:
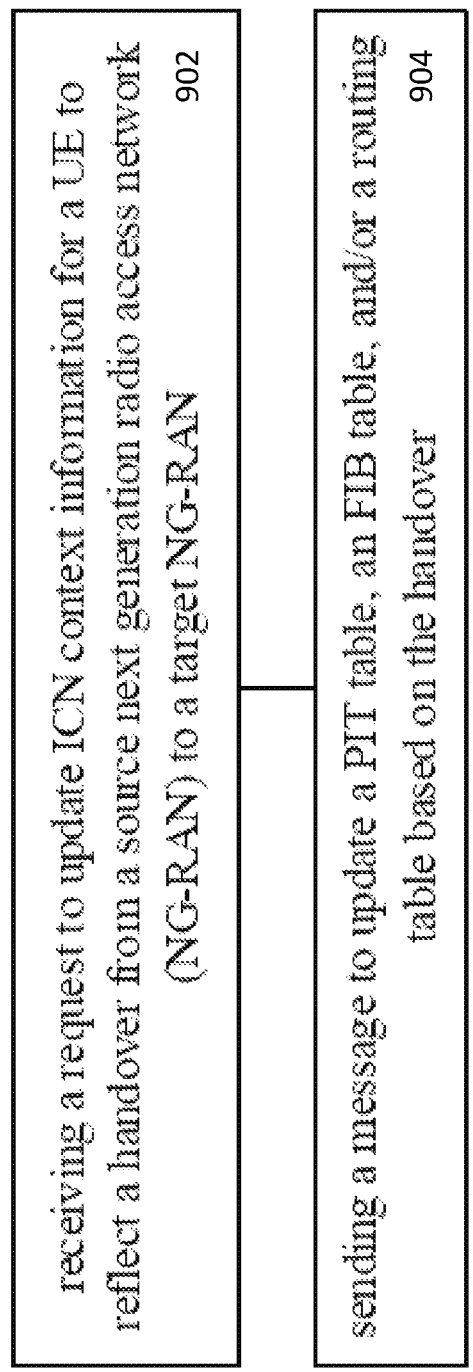
FIG. 9 is an ICN context update method in accordance with some embodiments.

FIG. 9 is an ICN context update method in accordance with some embodiments. The method shown in FIG. 9 may include receiving, at an ICN-CF, a request to update ICN context information for a UE to reflect a handover from a source NG-RAN to a target NG-RAN at operation 902. In response, the ICN-CF may send, to one or more ICN-Routers, a message to update a PIT, a FIB table, and/or a routing table based on the handover at operation 904.

Figure 10:
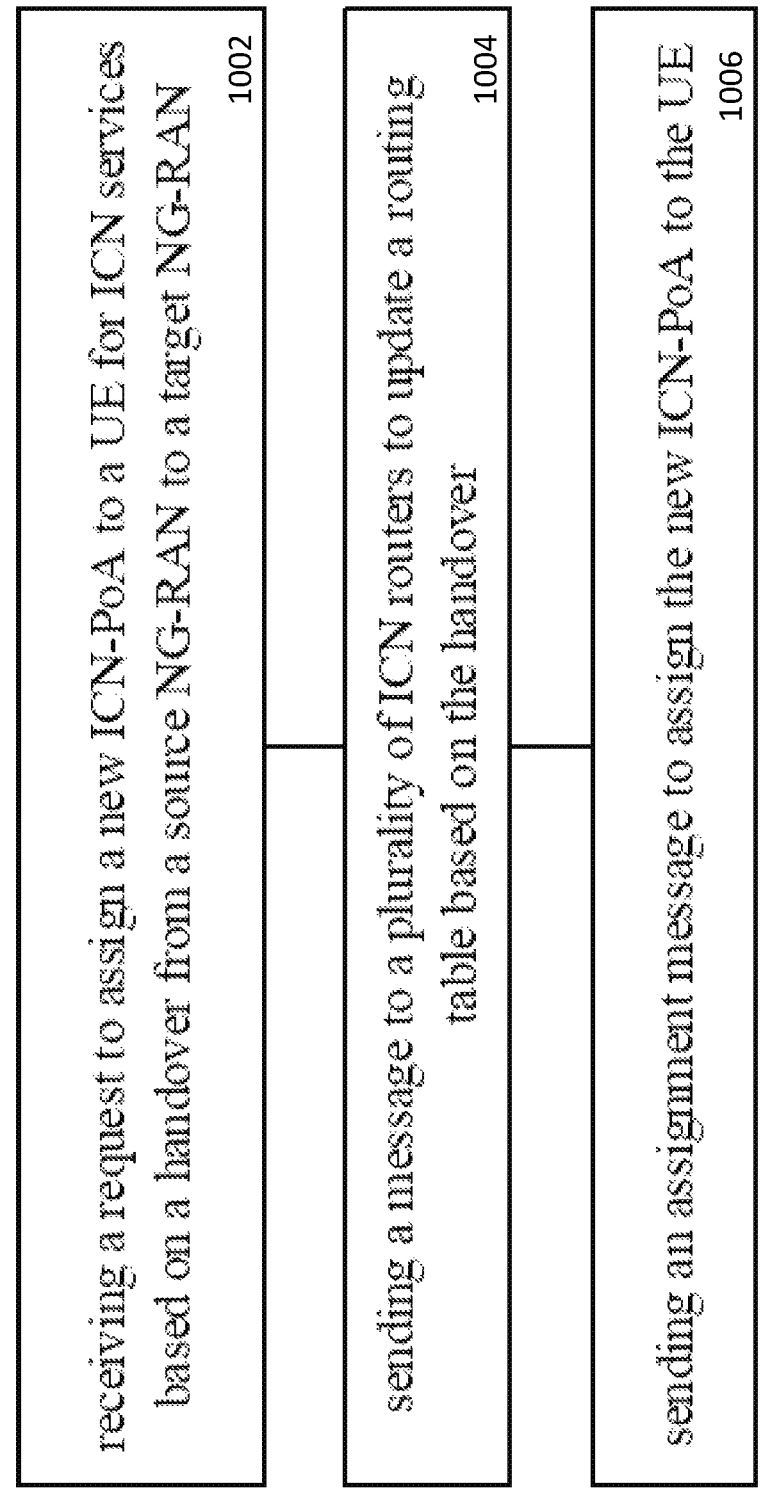
FIG. 10 is an ICN service request method in accordance with some embodiments.

FIG. 10 is an ICN service request method in accordance with some embodiments. The method shown in FIG. 10 may include the ICN-CF receiving a request to assign a new ICN-PoA to a UE for ICN services based on a handover from a source NG-RAN to a target NG-RAN at operation 1002. In response, the ICN-CF may, at operation 1004, send a message to a plurality of ICN routers to update a routing table based on the handover. The ICN-CF may also, at operation 1004, send an assignment message to assign the new ICN-PoA to the UE.

For at least some of the above procedures, a routing protocol may be available for the ICN-CF trigger the routing updates. One example of such protocol is Named-data Link State Routing protocol (NLSR Although an aspect has been described with reference to specific example aspects, it will be evident that various modifications and changes may be made to these aspects without departing from the broader scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus, the following claims are hereby incorporated into the Detailed Description, with each claim standing on its own as a separate aspect.

What is claimed is:

1. An apparatus, comprising:
   a memory; and
   processing circuitry in communication with the memory, wherein the processing circuitry is configured to:
      decode an information-centric networking (ICN) context information update request from an ICN Access and Mobility Function (ICN-AMF), the ICN context information update request indicating handover of a user equipment (UE) from a source radio access node (RAN) to a target RAN;
      determine an ICN-Point of Attachment (ICN-PoA) to which the UE is attached based on the source RAN;
      in response to a determination, based on the target RAN, that another ICN-PoA is to be selected for the UE after handover, encode, for transmission to an ICN router, an update indication to update the ICN router to indicate data communication with the UE is to occur through the target RAN, wherein the update indication includes a trigger routing update message to update a routing table of the ICN router;
      decode, from the ICN router in response to transmission of the update indication, an acknowledgment that the ICN router has been updated; and
      encode, for transmission to the ICN-AMF in response to reception of the acknowledgment, an ICN context information update response that indicates that the ICN router has been reconfigured.

2. The apparatus of claim 1,
   wherein the processing circuitry is further configured to determine the UE from a UE identity (ID) and the target RAN from a target RAN ID in the ICN context information update request.

3. The apparatus of claim 1,
   wherein the processing circuitry is further configured to:
      determine an ICN-Point of Attachment (ICN-PoA) to which the UE is attached based on the source RAN; and
      determine whether another ICN-PoA is to be selected for the UE after handover based on the target RAN.

4. The apparatus of claim 3,
   wherein the ICN router is the ICN-PoA, and wherein the processing circuitry is further configured to:
      in response to a determination that the ICN-PoA is to be used if the UE is attached to the target RAN, determine that an update of at least one of a Pending Interest Table (PIT) or Forward Information Base (FIB) table is to be performed in the ICN-PoA; and
      encode at least one of a PIT Update indication or FIB table Update indication as the update indication to the ICN-PoA, the at least one of a PIT Update or FIB table Update indication comprising a name that the ICN-PoA is to update in the at least one of the PIT or FIB table.

5. The apparatus of claim 4,
   wherein the processing circuitry is further configured to determine that the update of the at least one of the PIT or FIB table is:
      if the UE is a consumer, only an incoming face of the PIT for interest packets sent by the UE; and
      if the UE is a producer, only an outgoing face of the FIB table for data packets to be forwarded to the UE.

6. The apparatus of claim 1,
   wherein the trigger routing update message indicates the UE and a source ICN-PoA, a target ICN-PoA and an ICN gateway (ICN-GW) through which the UE is able to be reached.

7. The apparatus of claim 6,
   wherein the processing circuitry is further configured to encode the trigger routing update message to a plurality of ICN routers and decode a routing update acknowledgment from each of the ICN routers whose routing table has been updated.

8. The apparatus of claim 1,
   wherein the processing circuitry is further configured to:
      determine that the ICN context information update request has been received from a target ICN-AMF that is different from a source ICN-AMF stored in the memory as being associated with the UE;
      in response to a determination that the ICN context information update request has been received from the target ICN-AMF, determine routing information to be updated in each of a plurality of ICN routers in the network to communicate with the UE; and
      encode, for transmission to each of the plurality of ICN routers, a trigger routing update message that contains the routing information.

9. The apparatus of claim 8,
   wherein the processing circuitry is further configured to determine a target ICN-Point of Attachment (ICN-PoA) to which the UE is to be attached based on the target RAN; and
   wherein the routing information comprises an update of at least one of a Pending Interest Table (PIT) or Forward Information Base (FIB) table that comprises the target ICN-PoA that the ICN router is to update in the at least one of the PIT or FIB table.

10. The apparatus of claim 9,
wherein the processing circuitry is further configured to:
decode a routing update acknowledgment from each of the ICN routers whose routing table has been updated;
determine whether the routing table in each of the ICN routers in the network has been updated; and
in response to a determination that the routing table in each of the ICN routers in the network has been updated, encode, for transmission to the target AlVIF, a confirmation that the routing table in each of the ICN routers in the network has been updated to communicate with the UE.

11. An apparatus, comprising:
a memory; and
processing circuitry in communication with the memory, wherein the processing circuitry is configured to:
decode a trigger routing update message from an information-centric networking (ICN) Control Function (ICN-CF), the trigger routing update message indicating handover of a user equipment (UE) from a source radio access node (RAN) to a target RAN;
in response to reception of the trigger routing update message, update at least one of a face of a Pending Interest Table (PIT) or a face of a Forward Information Base (FIB) table to enable communication of data with the UE after handover, wherein, when the UE is a consumer, only an incoming face of the PIT for interest packets sent by the UE is updated, and wherein, when the UE is a producer, only an outgoing face of the FIB table for data packets to be forwarded to the UE is updated; and
encode, for transmission to the ICN-CF in response to updating of the at least one of the PIT or FIB table an acknowledgment that the at least one of the PIT or FIB table has been updated.

12. The apparatus of claim 11,
wherein the trigger routing update message comprises a UE identity (ID) of the UE and a target RAN ID of the target RAN.

13. The apparatus of claim 12,
wherein the trigger routing update message further comprises identification of a source ICN Point of Attachment (ICN-PoA) to which the UE is attached before the handover and a target ICN-PoA to which the UE is to be attached after the handover.

14. The apparatus of claim 13,
wherein the processing circuitry is configured to:
determine whether the source ICN-PoA serves at least one UE other than the UE; and
if the source ICN-PoA serves the at least one UE, update the at least one of the PIT or FIB table to enable data communication with the UE and the at least one UE other than the UE.

15. The apparatus of claim 13,
wherein the trigger routing update message further comprises identification of an ICN gateway (ICN-GW) through which the UE is able to be reached.

16. The apparatus of claim 11,
wherein the handover is an N2-based handover as there is no Xn interface between the source RAN and the target RAN.

17. A non-transitory computer-readable storage medium that stores instructions for execution by one or more processors of an information-centric networking Control Function (ICN-CF) in a $5^{th}$ generation (5G) network, the one or more processors to configure the ICN-CF to, when the instructions are executed:
receive an ICN context information update request from an ICN Access and Mobility Function (ICN-AMF), the ICN context information update request indicating handover of a user equipment (UE) from a source radio access node (RAN) to a target RAN;
transmit, to an ICN router, an update indication to update at least one of a Pending Interest Table (PIT) or Forward Information Base (FIB) table in the ICN router to enable data communications with the UE, wherein, when the UE is a consumer, only an incoming face of the PIT for interest packets sent by the UE is updated, and wherein, when the UE is a producer, only an outgoing face of the FIB table for data packets to be forwarded to the UE is updated;
receive, from the ICN router in response to transmission of the update indication, an acknowledgment that the at least one of the PIT or FIB table of the ICN router has been updated; and
transmit, to the ICN-AMF in response to reception of the acknowledgment, an ICN context information update response that the ICN router has been reconfigured.

18. The non-transitory computer-readable storage medium of claim 17,
wherein a trigger routing update message comprises a UE identity (ID) of the UE and a target RAN ID of the target RAN, and
wherein, if a source ICN Point of Attachment (ICN-PoA) is used before the handover and a target ICN-PoA is used after the handover, the trigger routing update message further comprises a source ICN-PoA ID of the source ICN-PoA and a target ICN-PoA ID of the target ICN-PoA.

19. The non-transitory computer-readable storage medium of claim 18,
wherein the trigger routing update message further comprises identification of an ICN gateway (ICN-GW) through which the UE is able to be reached.

20. The non-transitory computer-readable storage medium of claim 17,
wherein the handover is an N2-based handover as there is no Xn interface between the source RAN and the target RAN.

* * * * *